(No Model.)

T. ANDREWS.
CULTIVATOR.

No. 584,254.   Patented June 8, 1897.

Witnesses.
Samuel Gilbert Patterson
Warren Murry Stee

Inventor.
Talbot Andrews

UNITED STATES PATENT OFFICE.

TALBOT ANDREWS, OF MONMOUTH, ILLINOIS.

CULTIVATOR.

SPECIFICATION forming part of Letters Patent No. 584,254, dated June 8, 1897.

Application filed August 4, 1896. Serial No. 601,677. (No model.)

*To all whom it may concern:*

Be it known that I, TALBOT ANDREWS, of Monmouth, in the county of Warren and State of Illinois, have invented a new and useful Improvement in Cultivators, of which the following is a specification.

My invention is an improvement in the class of wheeled straddle-row cultivators for corn and cotton whose cultivating devices are adapted to act on two rows of corn, &c., at once and which may be shifted laterally by means of a system of levers without necessitating any change in the direction taken by the team.

The invention is embodied in the construction and arrangement of parts hereinafter described and claimed.

Figure 1:
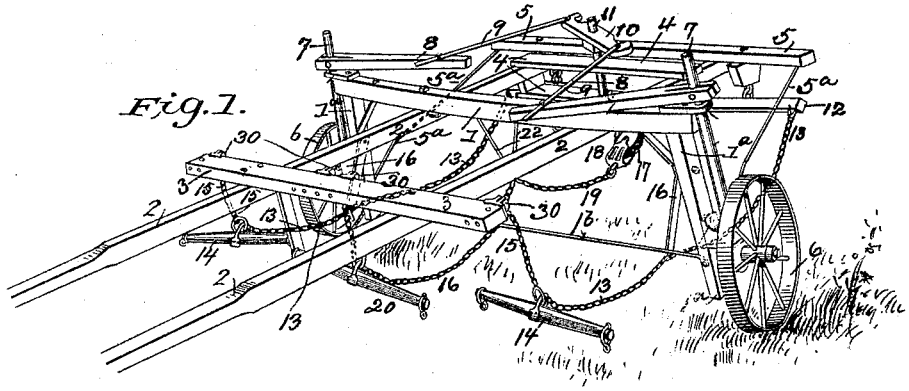
Figure 2:
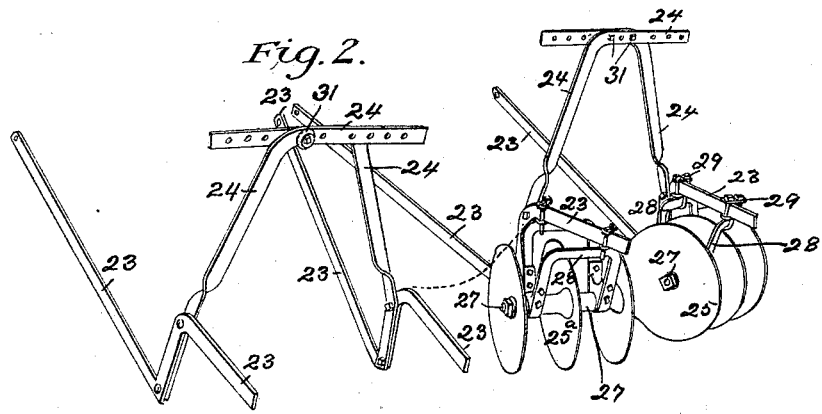
Figure 3:
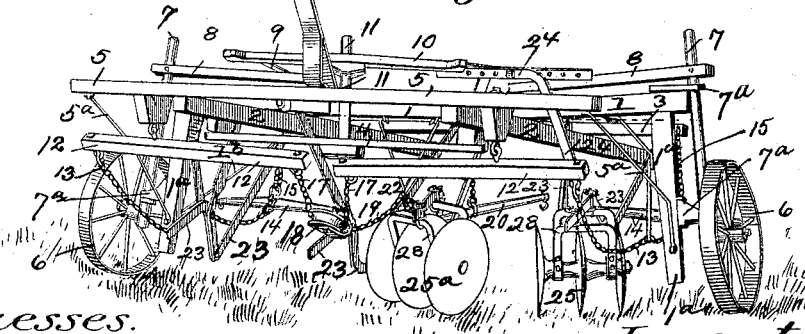

In accompanying drawings, Figure 1 is a front perspective view of my improved machine. Fig. 2 is a rear perspective view of the cultivating attachment proper. Fig. 3 is a rear perspective view of the machine.

The frame is composed of the central transverse beam 1, having pendent braced portions 1ª, the parallel shafts 2, connected by said beam 1, also by the front cross-bar 3, the two rear cross-bars 4, arranged one over the other, and the single rear cross-bar 5. The latter is connected with the standards 1ª by inclined brace-rods 5ª, and the standards are also braced by rods 1ᵇ.

The wheels 6 are arranged opposite each other at the foot of the pendent standards 1ª and mounted on short axles projecting from the lower ends of vertical shafts 7, that rotate in perforated brackets 7ª, Figs. 1 and 3. Horizontal levers 8 are secured to the upper ends of said shafts 7 and are connected by rods 9 with the ends of a foot-lever 10, which is pivoted and thus adapted to oscillate on a short vertical shaft 11, pivoted centrally in the parallel rear cross-bars 4. The driver's seat, Fig. 3, is located in rear of the lever 10, so that he may easily shift the latter with his feet and thereby rock the vertical shafts 7 simultaneously, and thereby turn the wheels 6 laterally at an inclination to the shafts 2 and to the general direction of movement of the machine. Thus the cultivator may be shifted laterally independently or without the aid of the team, as required to enable the cultivating devices to be placed so as to work, as required, nearer to or farther from one side or the other of the rows of plants along and over which the cultivator is drawn.

The draft attachment is constructed and arranged as follows: Two draft-levers 12, Fig. 3, are pivoted at the rear of the machine to brackets secured to the under side of the rear cross-bar 5. The outer ends of these levers 12 are connected by chains 13 with singletrees 14, suspended by short chains 15 from the front cross-bar 3. Said chains 13 are also supported at their middle by means of pendent bars 16, pivoted to the frame-standards 1ª. The inner ends of said levers 12 are connected by a chain 17, that passes around a sheave 18, from which a chain 19 extends forward to a third singletree 20, which is suspended between the others, 14, by a chain 21. The draft-chain 19 is supported centrally by a swinging hanger 22, pivoted to beam 1. The longer arms of the draft-levers 12 are adjacent to each other, and it is apparent I thus provide a three-horse evener attachment in which the draft of the middle horse equals or balances the other two.

The cultivating attachment proper is constructed as follows: Fig. 2 shows a complete attachment on the right, that on the left being shown incomplete in order to better show the construction and connection of the draft-bars 23 with the arches 24. There are two double duplicate sets of cultivating devices for cultivating two rows of plants at the same time. Each of said sets is composed of two gangs of rotary disks, a vertical arch which rigidly connects them, and two pivoted draft-bars attached to said gangs and arch. The particular construction and arrangement of these parts are as follows: The concave disks 25 25ª are mounted rotatably on axles 27, arranged at a slight angle to each other and having two upwardly-projecting inverted-U-shaped brackets 28, to which the draft-beams 23 are adjustably secured by means of clevises 29. The upper side of the brackets 28 is horizontal or straight and the angles of the axles 27 and their disks 25 and 25ª may be changed at will relative to the draft-bars 23 and the direction of motion of the machine to cause the disks 2 to stir the soil to a greater or less degree and to throw it laterally nearer to or farther from the plants, as desired. The draft-bars 23 are pivoted to brackets 30 on the front cross-bar 3 and constructed with a drop or angle directly in front of the disks, which provides a nearly vertical portion for attachment of the angular bars comprising the arch 24. The two draft-bars 23 are adjustably connected by said arches, the horizontal top portions of the angle-bars being laid together flatwise and perforated to adapt them to be secured together by means of blocks 31, as shown. It is obvious that the bars may be adjusted different distances apart, thus contracting or widening the arches, according as it is desired to have greater or less space between the two sets of disks.

What I claim is—

1. In a cultivator, the combination, with the frame, of the three-horse draft attachment composed of parts arranged as follows: two draft-levers 12, pivoted at the rear of the machine, a short chain connecting their longer inner arms, three draft-chains connected with said levers and short chain, and extending forward, as shown, singletrees attached to the front ends of said draft-chains, and swinging devices for suspending the chains from the frame, as shown and described.

2. In a cultivator, the combination, with the frame, of a draft-bar and rotary disks, a horizontal axle for the latter, two inverted-U brackets secured to said axle and diverging from each other at an angle, the said draft-bar resting on the horizontal top portion of said brackets, and adjustable clamps which secure the bars and brackets together in any adjustment, as shown and described.

TALBOT ANDREWS.

Witnesses:
W. M. STICE,
S. G. PATTERSON.